United States Patent
Gilliland

(10) Patent No.: US 7,289,006 B2
(45) Date of Patent: Oct. 30, 2007

(54) METHOD AND APPARATUS FOR IMPLEMENTING COMMON MODE CABLE NOISE SUPPRESSION FOR MEDIUM RANGE FREQUENCIES

(75) Inventor: Don Alan Gilliland, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 12 days.

(21) Appl. No.: 11/212,008

(22) Filed: Aug. 25, 2005

(65) Prior Publication Data

US 2007/0080755 A1    Apr. 12, 2007

(51) Int. Cl.
*H04B 3/28* (2006.01)
*H03H 7/00* (2006.01)

(52) U.S. Cl. .......................................... 333/12; 333/181
(58) Field of Classification Search ................ 333/12, 333/181, 185; 361/818
See application file for complete search history.

(56) References Cited

U.S. PATENT DOCUMENTS

| | | | | |
|---|---|---|---|---|
| 4,230,966 A | * | 10/1980 | Compen ..................... | 313/481 |
| 5,287,074 A | * | 2/1994 | Meguro et al. ............... | 333/12 |
| 5,334,955 A | * | 8/1994 | Strnad ......................... | 333/12 |
| 5,628,653 A | * | 5/1997 | Haas et al. ................. | 439/607 |
| 5,763,825 A | * | 6/1998 | Gilliland ..................... | 174/36 |
| 6,054,649 A | * | 4/2000 | Uchida et al. ............... | 174/36 |
| 6,314,182 B1 | * | 11/2001 | Brandt ....................... | 379/412 |
| 6,469,594 B1 | * | 10/2002 | Ticarano .................... | 333/181 |
| 6,933,805 B1 | * | 8/2005 | Norte et al. ................ | 333/185 |

* cited by examiner

*Primary Examiner*—Steven Loke
*Assistant Examiner*—Andrés López-Esquerra
(74) *Attorney, Agent, or Firm*—Joan Pennington

(57) ABSTRACT

A method, apparatus, and a localized in-line cable filter system are provided for implementing electromagnetic cable noise suppression. The localized in-line cable filter system includes at least one electromagnetic interference (EMI) filter element connected between a cable and a current return path. An insulation displacement terminal connects the EMI filter element to the cable. The EMI filter element and current return path provide a low impedance connection toward a source.

10 Claims, 4 Drawing Sheets

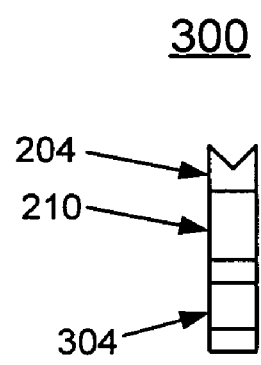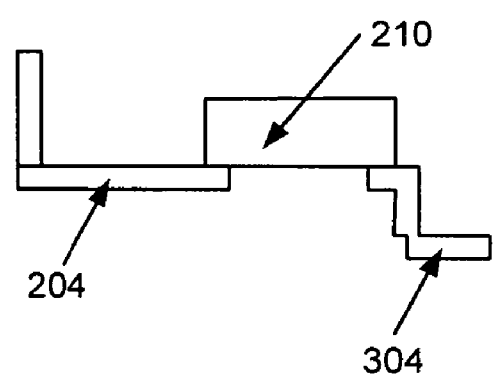
FIG. 4
FIG. 5

METHOD AND APPARATUS FOR IMPLEMENTING COMMON MODE CABLE NOISE SUPPRESSION FOR MEDIUM RANGE FREQUENCIES

FIELD OF THE INVENTION

The present invention relates generally to the field of electromagnetic interference (EMI) noise suppression, and more particularly, relates to a method, apparatus, and a localized in-line cable filter system for implementing electromagnetic cable noise suppression including common mode medium range frequencies suppression.

DESCRIPTION OF THE RELATED ART

Electromagnetic emissions can create problems in various electronic systems. Electromagnetic emissions are often coupled to a cable internally and/or externally and often times cannot be removed at the receiving peripheral. Also the coupled interference can be coming from a source that is not under the developer's control.

Ferrite cores often are used for reducing electromagnetic emissions. However, a ferrite core only may not provide enough series impedance to drop the common mode emissions to allow the electronic system to pass required standards for electromagnetic emissions.

A need exists for an effective mechanism for implementing electromagnetic cable noise suppression including common mode medium range frequencies suppression.

SUMMARY OF THE INVENTION

Principal aspects of the present invention are to provide a method, apparatus, and localized in-line cable filter system for implementing electromagnetic cable noise suppression. Other important aspects of the present invention are to provide such method, apparatus, and localized in-line cable filter system for implementing electromagnetic cable noise suppression substantially without negative effect and that overcome many of the disadvantages of prior art arrangements.

In brief, a method, apparatus, and a localized in-line cable filter system are provided for implementing electromagnetic cable noise suppression. The localized in-line cable filter system includes at least one electromagnetic interference (EMI) filter element connected between a cable and a current return path member. An insulation displacement terminal connects the EMI filter element to the cable. The EMI filter element and current return path member provide a low impedance connection toward a source.

In accordance with features of the invention, the current return path member includes a grounding conductor connected to the source. A bonding strap connected to the source can provide the current return path member.

In accordance with features of the invention, the current return path member returns current to the source, while minimizing the loop current path distance. The current return path member connection to the source has a minimized or short length from the EMI filter element to the source.

In accordance with features of the invention, when used with a ribbon cable, the localized in-line cable filter system can include a respective EMI filter element connected between a respective cable or wire conductor of the ribbon cable and a shielding or bonding strap current return path. A wire conductor of the ribbon cable can provide the current return path member.

BRIEF DESCRIPTION OF THE DRAWINGS

The present invention together with the above and other objects and advantages may best be understood from the following detailed description of the preferred embodiments of the invention illustrated in the drawings, wherein:

FIGS. 4 and 5 are front and side views of the insulation displacement connector and filter circuit connection apparatus of FIG. 3 in accordance with the preferred embodiment.

DETAILED DESCRIPTION OF THE PREFERRED EMBODIMENTS

In accordance with features of the preferred embodiments, placement of contact decoupling capacitors is enabled after the portion on the cable where the cable is coupled to a source. A localized in-line cable filter circuit is provided. The filter circuit allows the noise current to be shunted back to the source, which is best condition while the series ferrite core provides an impedance to lower the current down the line that is opposite to the source side of the cable.

In accordance with features of the preferred embodiments, the noise current is coupled onto the cable and is coupled back to the source by the localized in-line cable filter circuit via a shield or bond connection that may be separate or may be wrapped around the source side of the cable. The use of discrete capacitors enabled by the preferred embodiments is needed for various frequencies, usually medium range frequencies lower than 1000 Mhz. A low impedance path is provided via the bonded and/or shielded connection back toward the interfering source. This is usually the best connection since coming back to the chassis forces the current through a smaller circuitous route than through the earthed connections.

Figure 1:
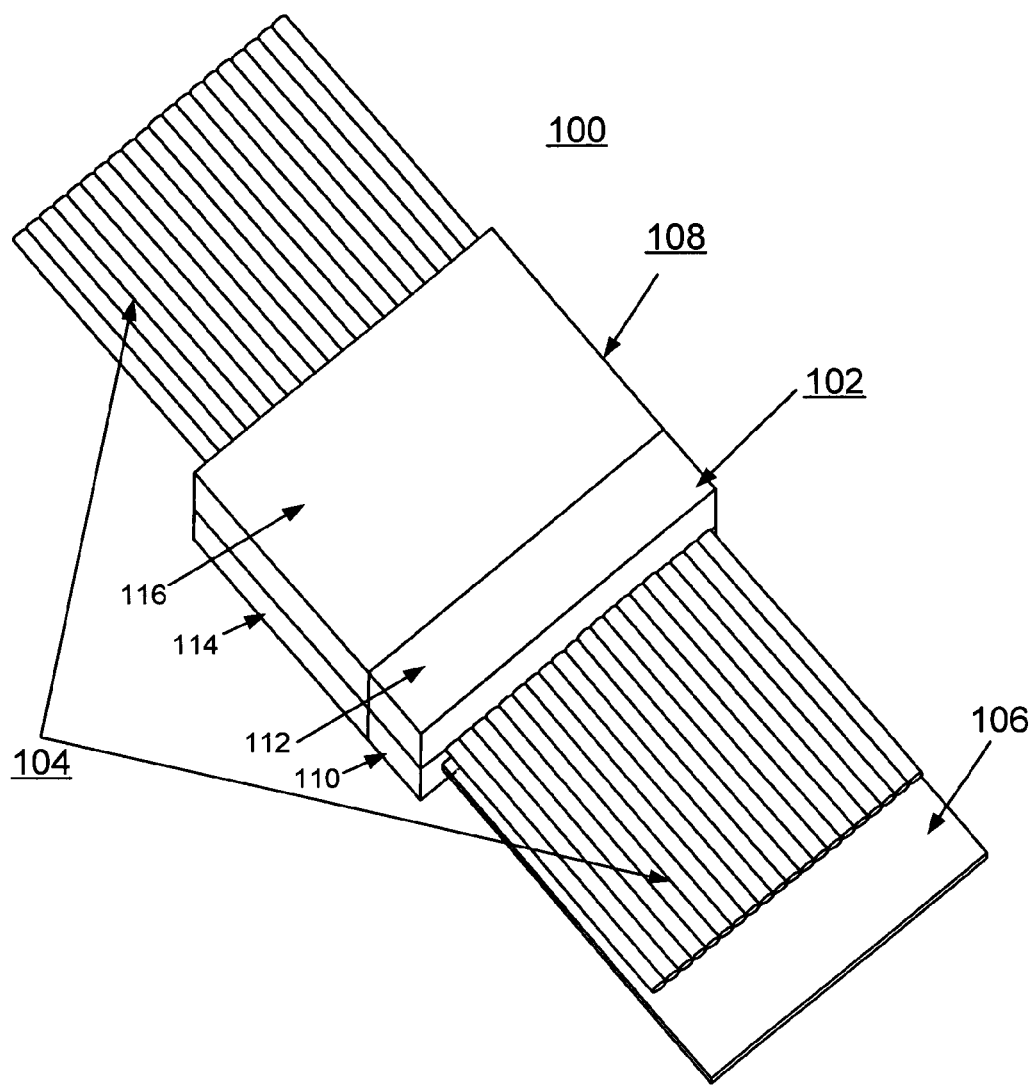
FIG. 1 is a perspective view not to scale illustrating an exemplary localized in-line cable filter system in accordance with the preferred embodiment.

Having reference now to the drawings, in FIG. 1, there is shown an exemplary localized in-line cable filter system generally designated by the reference character 100 for implementing electromagnetic cable noise suppression of the preferred embodiment.

The localized in-line cable filter system 100 includes an electromagnetic interference (EMI) filter generally designated by 102 connected between a cable generally designated by 104 and a current return path member 106. The return current path member 106 advantageously is arranged to return the current to the source in a minimized or smallest loop possible. The return current path member 106 is formed, for example, from a thin sheet of metal, a metal mesh member, or a wire conductor.

The localized in-line cable filter system 100 preferably includes a ferrite core generally designated by 108 surrounding the cable 104 on the side of the EMI filter 102 opposite from the source. As shown in FIG. 1, the EMI filter 102 is formed by a pair of respective mating housing or clamp members 110, 112. A pair of respective ferrite core members 114, 116 preferably forms the ferrite core 108 for easy assembly with the cable 104.

While a ribbon cable 104 is shown, it should be understood that the present invention is not limited to the use of a ribbon cable, various cable arrangements can be used with the localized in-line cable filter system 100 for implementing electromagnetic cable noise suppression of the preferred embodiment. For example, the localized in-line cable filter system 100 can be used with a free cable, which is a non-ribbon arrangement.

The return current path member 106 can be implemented with, for example, one or more cable conductors, such as predefined conductor or wire within the ribbon cable. The return current path member 106 advantageously can be implemented with, for example, a bonding strap or a shielded connection that may be separate or wrapped around the source side of the cable 104.

Figure 2:
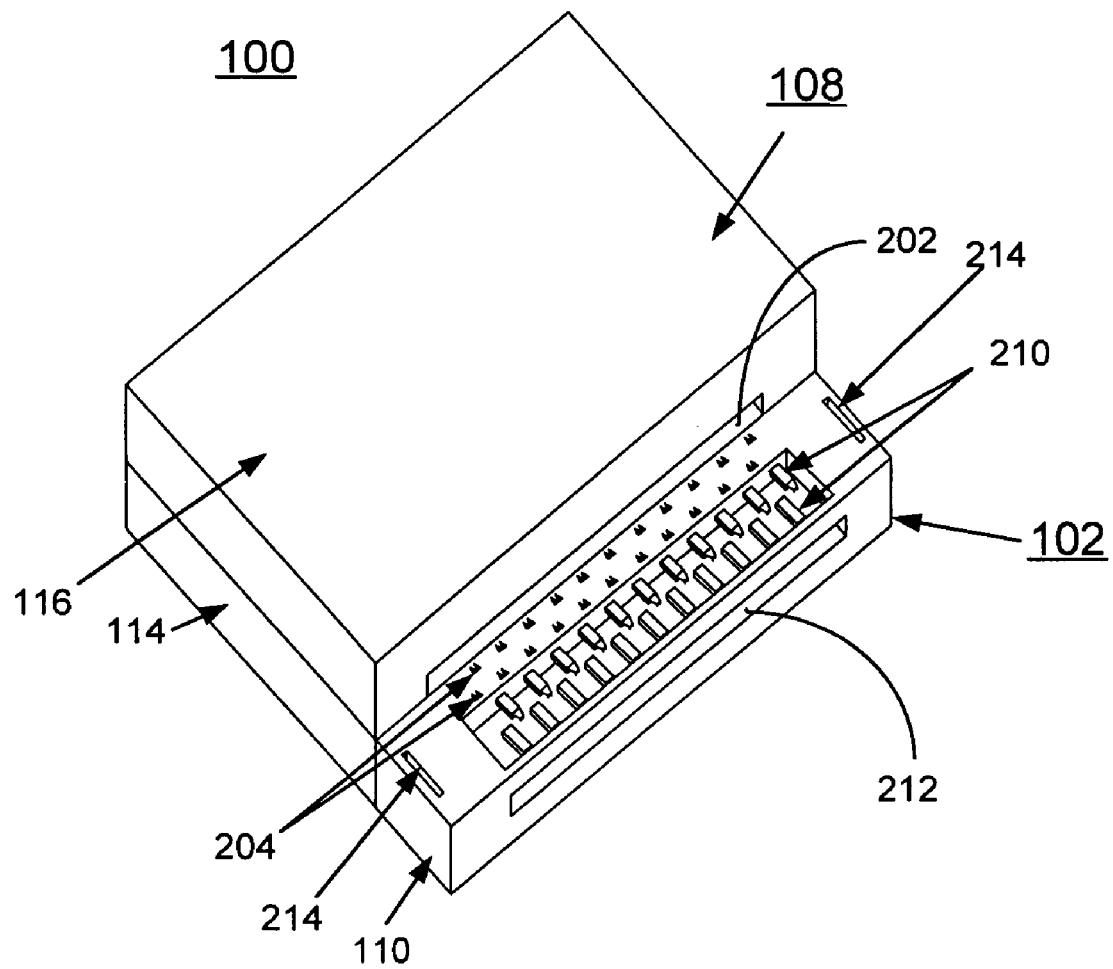
FIG. 2 is a perspective view not to scale illustrating interior details of the exemplary localized in-line cable filter system in accordance with the preferred embodiment.

Referring also to FIG. 2, the lower housing or clamp member 110 of the EMI filter 102 is shown with the upper insulation displacement clamp member 112 removed. An opening or passageway 202 for receiving the ribbon cable 104 (not shown in FIG. 2) is defined between the ferrite core members 114,116 forming the ferrite core 108. The lower housing member 110 includes a plurality of insulation displacement terminals 204 arranged in dual, staggered rows.

As shown in FIG. 2, a plurality of EMI filter elements 210 are arranged in dual, staggered rows within the lower housing member 110, with a respective EMI filter element 210 in line with each of insulation displacement terminals 204. Each EMI filter element 210 preferably is implemented with a discrete value capacitor or other equivalent circuit EMI filter element.

The lower housing member 110 includes an opening or passageway 212 for receiving the return current path member 106. The lower housing member 110 includes a pair of keying or positioning features 214 for cooperative engagement with mating features of the upper housing member 112. The lower housing member 110 and upper housing member 112 are formed of an electrically insulative material, such as a plastic material.

Figure 3:
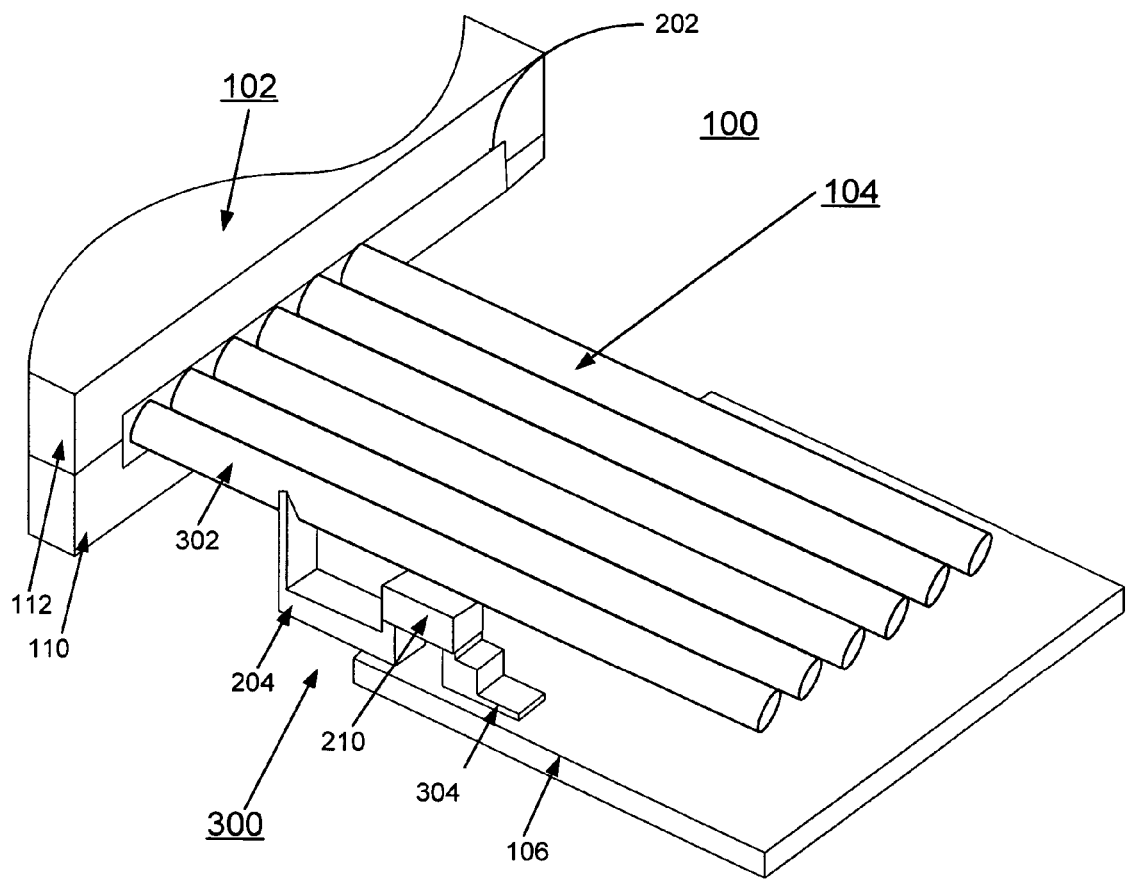
FIG. 3 is a partial perspective view of the exemplary localized in-line cable filter system of FIG. 1 illustrating insulation displacement connector and filter circuit apparatus in accordance with the preferred embodiment.

Referring to FIG. 3, the localized in-line cable filter system 100 includes insulation displacement connector and filter circuit apparatus generally designated by the reference character 300.

Referring also to FIGS. 4 and 5, there are shown detailed views of the insulation displacement connector and filter circuit connection apparatus 300 in accordance with the preferred embodiment.

Apparatus 300 includes at least one insulation displacement terminal 204 connected between a cable 302 of the ribbon cable 104 and the respective discrete value capacitor or other equivalent circuit EMI filter element 210. A conductor member 304 connects the capacitor or EMI filter element 210 to the return current path member 106.

The capacitor or EMI filter element 210 provides a return path for the coupled current through the bonding strap 106. The return path strap 106 preferably is short with respect to the wavelength of the problem frequency and should return the current to the source in the smallest loop possible.

While the present invention has been described with reference to the details of the embodiments of the invention shown in the drawing, these details are not intended to limit the scope of the invention as claimed in the appended claims.

What is claimed is:

1. A localized in-line cable filter system for implementing electromagnetic cable noise suppression comprising:
   a cable connected to a noise source; said cable comprising a ribbon cable including a plurality of wires extending parallel to each other in a common plane;
   an electromagnetic interference (EMI) filter disposed near the noise source;
   said EMI filter including a plurality of EMI filter elements arranged in dual, staggered rows within a housing; said plurality of said electromagnetic interference (EMI) filter elements connected to said ribbon cable; at least one said EMI filter element being implemented with at least one discrete value capacitor;
   a ferrite core surrounding said cable disposed proximate one side of said housing of said EMI filter opposite the noise source; and
   a current return path member coupled between said EMI filter element and the noise source; said current return path member shunting noise current back to the noise source; said current return path member comprising a sheet metal member extending through a generally rectangular slot defined in said housing and in a plane adjacent to said common plane of said ribbon cable; said current return path member having a minimized path length for connecting to the noise source; and said housing containing said at least one discrete value capacitor implementing one said EMI filter element, said connection of said EMI filter elements to said ribbon cable and a portion of said current return path member.

2. A localized in-line cable filter system as recited in claim 1 wherein said EMI filter includes an insulation displacement terminal connecting said EMI filter element to said cable.

3. A localized in-line cable filter system as recited in claim 1 wherein said EMI filter includes a conductor member connecting said EMI filter element to said current return path member.

4. A localized in-line cable filter system as recited in claim 1 wherein said housing is formed by a pair of mating housing members.

5. A localized in-line cable filter system as recited in claim 4 wherein said mating housing members are formed of electrically insulative material.

6. A localized in-line cable filter system as recited in claim 4 wherein one of said housing members contains said EMI filter elements, said ribbon cable and at least one insulation displacement terminal; said insulation displacement terminal connecting said EMI filter element to one of said plurality of wires of said ribbon cable.

7. Apparatus for implementing electromagnetic cable noise suppression comprising:
   a cable connected to a noise source; said cable comprising a ribbon cable including a plurality of wires extending parallel to each other in a common plane;
   an electromagnetic interference (EMI) filter including a plurality of EMI filter elements arranged in dual, staggered rows within a housing; said plurality of said electromagnetic interference (EMI) filter elements connected to said ribbon cable; at least one said EMI filter element being implemented with at least one discrete value capacitor;

a ferrite core surrounding said cable disposed proximate one side of said housing of said EMI filter opposite the noise source;

a current return path member coupled between said EMI filter element and the noise source; said current return path member shunting noise current back to the noise source; said current return path member comprising a sheet metal member extending through a generally rectangular slot defined in said housing and in a plane adjacent to said common plane of said ribbon cable; said current return path member having a minimized path length for connecting to the noise source; and said housing containing said at least one discrete value capacitor implementing one said EMI filter element, said connection of each said EMI filter element to said ribbon cable and a portion of said current return path member; said housing being formed by a pair of mating housing members; said mating housing members formed of electrically insulative material.

8. Apparatus for implementing electromagnetic cable noise suppression as recited in claim 7 includes an insulation displacement terminal connecting said EMI filter element to said cable.

9. Apparatus for implementing electromagnetic cable noise suppression as recited in claim 7 wherein each said EMI filter element and said current return path provide a low impedance connection toward a source.

10. A method for implementing electromagnetic cable noise suppression comprising the steps of:

providing a cable connected to a noise source; said cable comprising a ribbon cable including a plurality of wires extending parallel to each other in a common plane;

providing an electromagnetic interference (EMI) filter including a plurality of said electromagnetic interference (EMI) filter elements arranged in dual, staggered rows within a housing disposed near the noise source;

connecting said plurality of said electromagnetic interference (EMI) filter elements of said EMI filter to said ribbon cable; at least one said EMI filter element being implemented with at least one discrete value capacitor including a connection to said cable;

providing a ferrite core surrounding said cable disposed proximate one side of said EMI filter opposite the noise source;

coupling a current return path member between said EMI filter element and the noise source; said current return path member comprising a sheet metal member extending through a generally rectangular slot defined in said housing and in a plane adjacent to said common plane of said ribbon cable; said current return path member shunting noise current back to the noise source; said current return path member having a minimized path length for connecting to the noise source; and providing said housing containing said at least one discrete value capacitor and said connection to said cable, and a portion of said current return path member; said housing being formed by a pair of mating housing members; said matting housing members formed of electrically insulative material.

\* \* \* \* \*